United States Patent [19]

Shimazu et al.

[11] Patent Number: 5,654,627
[45] Date of Patent: Aug. 5, 1997

[54] METHOD OF AUTOMATICALLY CHANGING UPPER, BALANCED AND LOWER VOLTAGE IN ELECTRIC POWER SAVING TRANSFORMER AND THE DEVICE OF THE SAME

[75] Inventors: Kunio Shimazu; Chiyuki Shimazu, both of Urawa, Japan

[73] Assignee: Aikoh Electric Corporation, Saitama-ken, Japan

[21] Appl. No.: 583,721

[22] Filed: Jan. 5, 1996

[30] Foreign Application Priority Data

Jan. 10, 1995 [JP] Japan .................. 7-001804

[51] Int. Cl.$^6$ ................................ G05F 1/20
[52] U.S. Cl. ........................ 323/258; 323/343
[58] Field of Search .................. 323/258, 263, 323/339, 343, 349

[56] References Cited

U.S. PATENT DOCUMENTS

| | | | |
|---|---|---|---|
| 3,600,668 | 8/1971 | Goldberg | 323/263 |
| 3,729,673 | 4/1973 | Schneider | 323/258 |
| 3,732,485 | 5/1973 | Kettler | 323/263 |
| 3,732,486 | 5/1973 | Schoendube | 323/263 |
| 4,623,834 | 11/1986 | Klingbiel et al. | 323/258 |
| 5,119,012 | 6/1992 | Okamura | 323/258 |

FOREIGN PATENT DOCUMENTS 4619450  10/1967  Japan ................... 323/258

*Primary Examiner*—Edward Tso
*Assistant Examiner*—Adolf Berhane
*Attorney, Agent, or Firm*—Griffin, Butler Whisenhunt & Kurtossy

[57] ABSTRACT

In an autotransformer of a single-phase three-wire system or a single-phase two-wire system, plural sets of main coils connected with input terminals are phase-wound on a single-phase core-type core, and further, between the ends of the main coils, plural sets of excitation coils mutually connected in series to wind on the single-phase core-type core are connected by plural combined connections. Further, plural sets of thyristors controlled ON/OFF by using the value measured by a voltage sensor connected to the aforementioned input terminals are provided between the aforementioned ends and the exciting coils. Therefore, the circuits are automatically changed in response to the increase and decrease of the input voltage, with a result that a load is not ill influenced so that the voltage value is always output within the predetermined range.

8 Claims, 3 Drawing Sheets

METHOD OF AUTOMATICALLY CHANGING UPPER, BALANCED AND LOWER VOLTAGE IN ELECTRIC POWER SAVING TRANSFORMER AND THE DEVICE OF THE SAME

BACKGROUND OF THE INVENTION

This invention relates to a device having a function of automatically adjusting a voltage which is output as an output voltage at a voltage within a predetermined range even when an input voltage is increased or decreased beyond the predetermined range of the voltage in an electric power saving device, such as a transformer.

In a conventional economy electricity apparatus, as shown in FIG. 3, plural sets of exciting coils L3, L4, L7 and L8, which are wound on a single-phase core-type core (9) in a mutually connected series, are connected between the ends of plural sets of main coils L1, L2, L5 and L6 which are phase-wound on the single- phase core-type core (9), in which the combinations of the exciting coils L3, L4, L7 and L8 are controlled by thyristors (1, 2) connected with a voltage sensor provided at the input ends of the main coils L1 and L5, whereby an input voltage is prevented from unnecessarily dropping.

For example, a circuit, on which the exciting coils are combined to cause the voltage to output by dropping by 6 V for the input voltage 100 V, is automatically changed to another circuit which has a lower-voltage rate of 3 V at a predetermined input voltage value, therefore, when the input voltage is decreased, the voltage is prevented from unnecessarily dropping so as to hold down the effect on a load as much as possible.

However, in order not to decrease the input voltage unnecessarily, in the conventional economy electricity apparatus, the output voltage value is adjusted by controlling only the value the input voltage is dropped, so that, when the value of the input voltage is smaller than the minimum voltage value required for a load, the voltage is therefore further decreased unnecessarily, consequently affecting the load.

SUMMARY OF THE INVENTION

To solve the aforementioned disadvantages, the present invention provides, as will be described in the following, an electric power saving device to automatically adjust a voltage within a predetermined range to make stable output possible regardless of the input voltage value.

An electric power saving transformer with an automatically transferring upper-balanced-lower voltage device, in an autotransformer of a single-phase three-wire system or a single-phase two-wire system, is characterized by phase-winding plural sets of main coils which are connected to input terminals on a single-phase core-type core; connecting plural sets of exciting coils mutually connected in series to wind the single-phase core-type core between the ends of the main coils by means of plural combinations of connections; connecting plural thyristors between the ends of said main coils and said exciting coils which are switched to ON/OFF based on the value detected by a voltage sensor connected to the input terminals; and disconnecting and connecting between the ends of said main coils and said exciting coils, by switching ON/OFF of said thyristors in order to automatically change output voltage correspondingly to input voltage onto circuits for upper-voltage, balanced-voltage and lower-voltage in an uninterrupted manner.

According to the electric power saving device of the present invention, the instant the voltage sensor detects an increase or decrease of the input voltage beyond the predetermined range of the voltage value, thyristors, which receive an output signal sent from the voltage sensor, control a combination of connection of the aforementioned plural sets of the exciting coils so as to adjust the lower or upper voltage rate of the input voltage value in order to be able to constantly output the voltage within the predetermined range. Furthermore, when the value of the input voltage is within the predetermined range and the voltage does not need to be increased or decreased, the voltage is output at the same value as the input voltage.

Hysteresis is provided by difference between input voltage values in which an upper-voltage rate or a lower-voltage rate are changed, when the input voltage is being increased or decreased, so that an error made by the device when a combination of connection the exciting coils are changed is prevented, and the coils are facilitated without being overloaded.

By using a zero-phase terminal, there is also an effect of preventing burn-out caused by high electric current flow to the exciting coils even when the difference of the input voltage between R-phase and T-phase is large.

According to the present invention as described so far, electric power is naturally saved by decreasing the output voltage, and furthermore, the voltage is facilitated to adjust to automatically output the voltage value within a predetermined range even when the input voltage rises or drops beyond the predetermined range of the voltage, whereby the ill influence to load is not caused. Furthermore, in the present invention, the output voltage is automatically adjusted by simply changing the connection of the exciting coils, so there is an advantage that the application to conventional device can be easily executed.

BRIEF DESCRIPTION OF THE DRAWINGS

The above and other objects, features and advantages of the present invention will be seen in reference to the following descriptions taken in connection with the accompanying drawings.

DETAILED DESCRIPTION OF THE PREFERRED EMBODIMENT(S)

The present invention will be described below with reference to the drawings.

Figure 1:
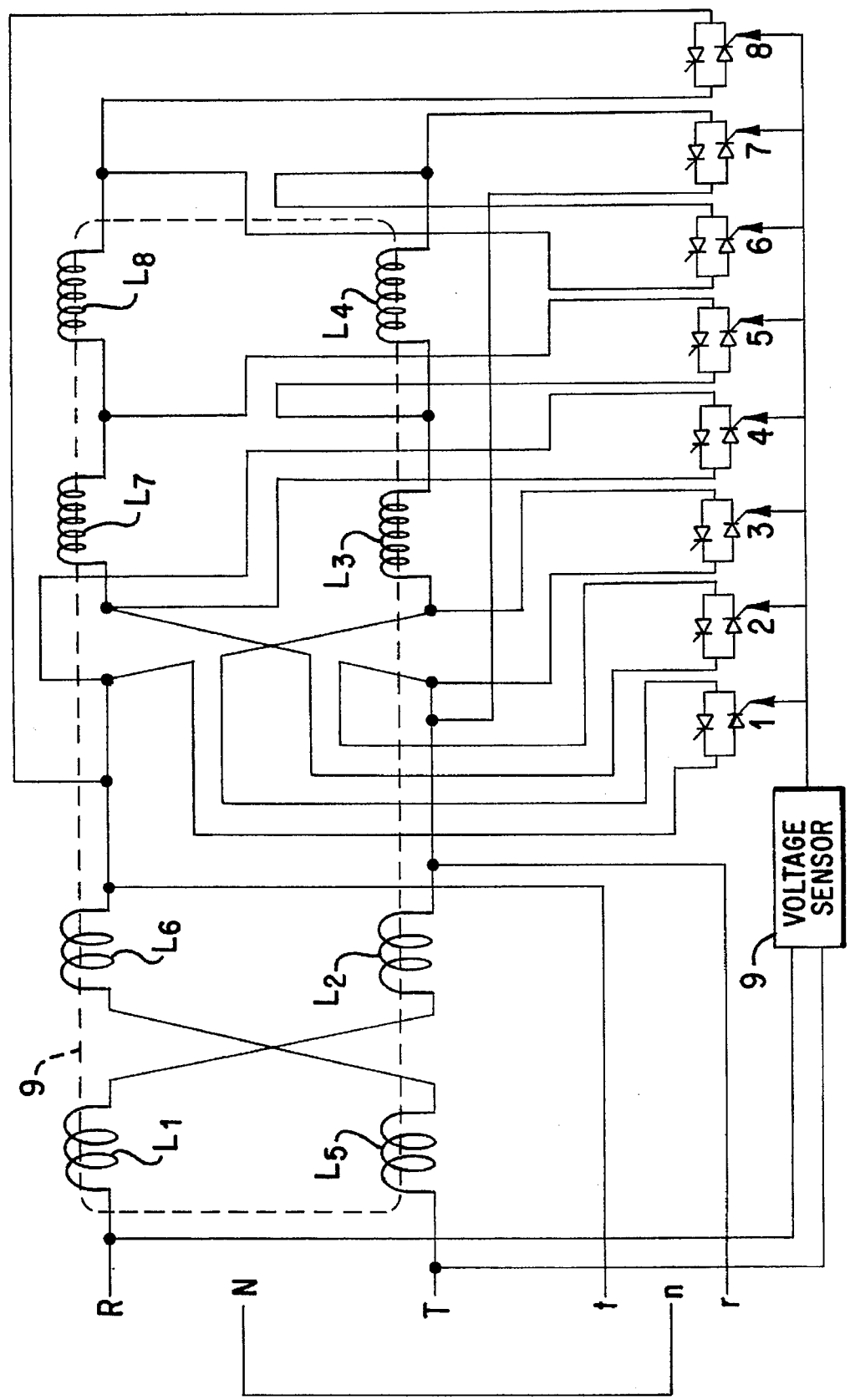
FIG. 1 is a brief block circuit diagram of an electric power saving transformer with an automatically transferring upper-balanced-lower voltage device according to the present invention.

FIG. 1 shows a brief block circuit diagram of an electric power saving transformer according to the present invention, in which, as illustrated with the circuit diagram in the drawing, plural main coils L1, L2 and L5, L6 connected with input terminals R and T respectively are phase-wound on a single-phase core-type core (9), and plural sets of exciting coils L3, L4 and L7, L8 connected in series respectively to wind on the single-phase core-type core (9) are connected between the end of the main coils L2 and L6 by plural combined connections. Further, an output terminal r of the transformer is connected between the main coil L2 and the exciting coil L3 of the aforementioned core(9), another output terminal t is connected between the main coil L6 and the exciting coil L7, and an input terminal N and an output terminal n of zero-phase are connected to one another.

A voltage sensor 9 for detecting the input voltage is designed in a base plate (not shown), in which one terminal is connected to the input terminals of the main coils L1, L5 and the other terminal is connected to thyristors (1, 2, 3, 4, 5, 6, 7, 8) designed respectively between the exciting coils, the thyristors being switched ON/OFF by a voltage value detected in the voltage sensor, to controlled to the combination of connection of main coil L1, L2, L5 and L6 and exciting coil L3, L4, L7 and L8 in the circuit, with the result that the output voltage is automatically adjusted.

As shown in FIG. 1, the aforementioned thyristors (1, 2, 3, 4, 5, 6, 7, 8) are respectively connected between coils, the thyristor (1) being connected between the main coil L6 and the exciting coil L3, the thyristor (2) being connected between the main coil L2 and the exciting coil L7, the thyristor (3) being connected between the main coil L2 and the exciting coil L3, the thyristor (4) being connected between the main coil L6 and the exciting coil L7, the thyristor (5) being connected between the exciting coil L3 and L7, the thyristor (6) being connected between the exciting coil L4 and L8, the thyristor (7) being connected between the main coil L2 and the exciting coil L4, and the thyristor (8) being connected between the main coil L6 and the exciting coil L8.

For example, under the condition that the predetermined lower voltage rate or upper voltage rate is defined as 3% and 6%, coils are defined to cause voltage to keep balance at 0% (0 V) and to drop or build up at 3% (3 V) or 6% (6 V) against an input voltage at 100 V, and the minimum voltage value to the load is 95 V, the change of the input voltage and the output voltage will be illustrated in detail with reference to a line chart in FIG. 2.

Figure 2:
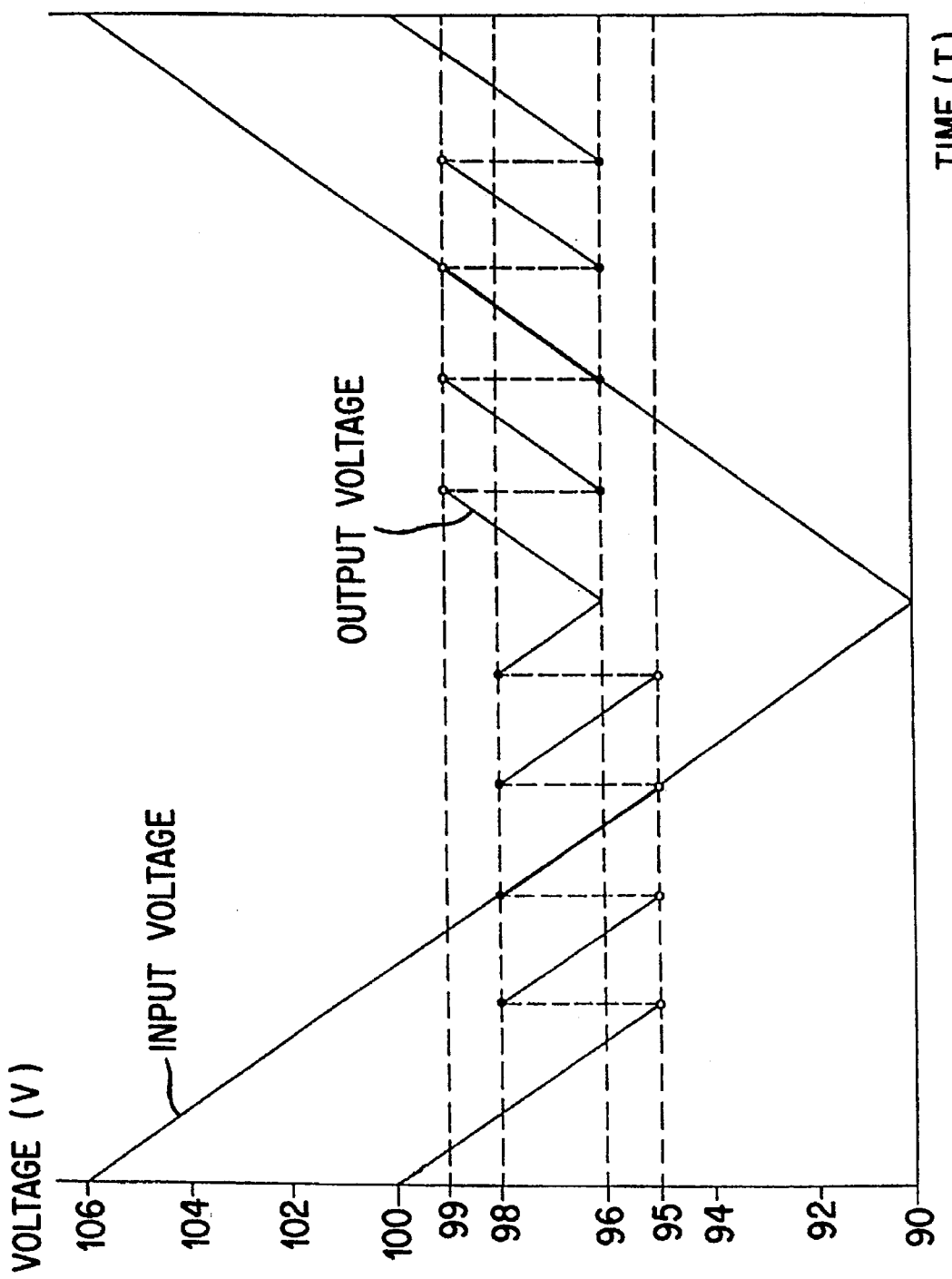
FIG. 2 is a line chart showing the change of input voltage and output voltage by the electric power saving transformer with the automatically transferring upper-balanced-lower voltage device according to the present invention.
Figure 3:
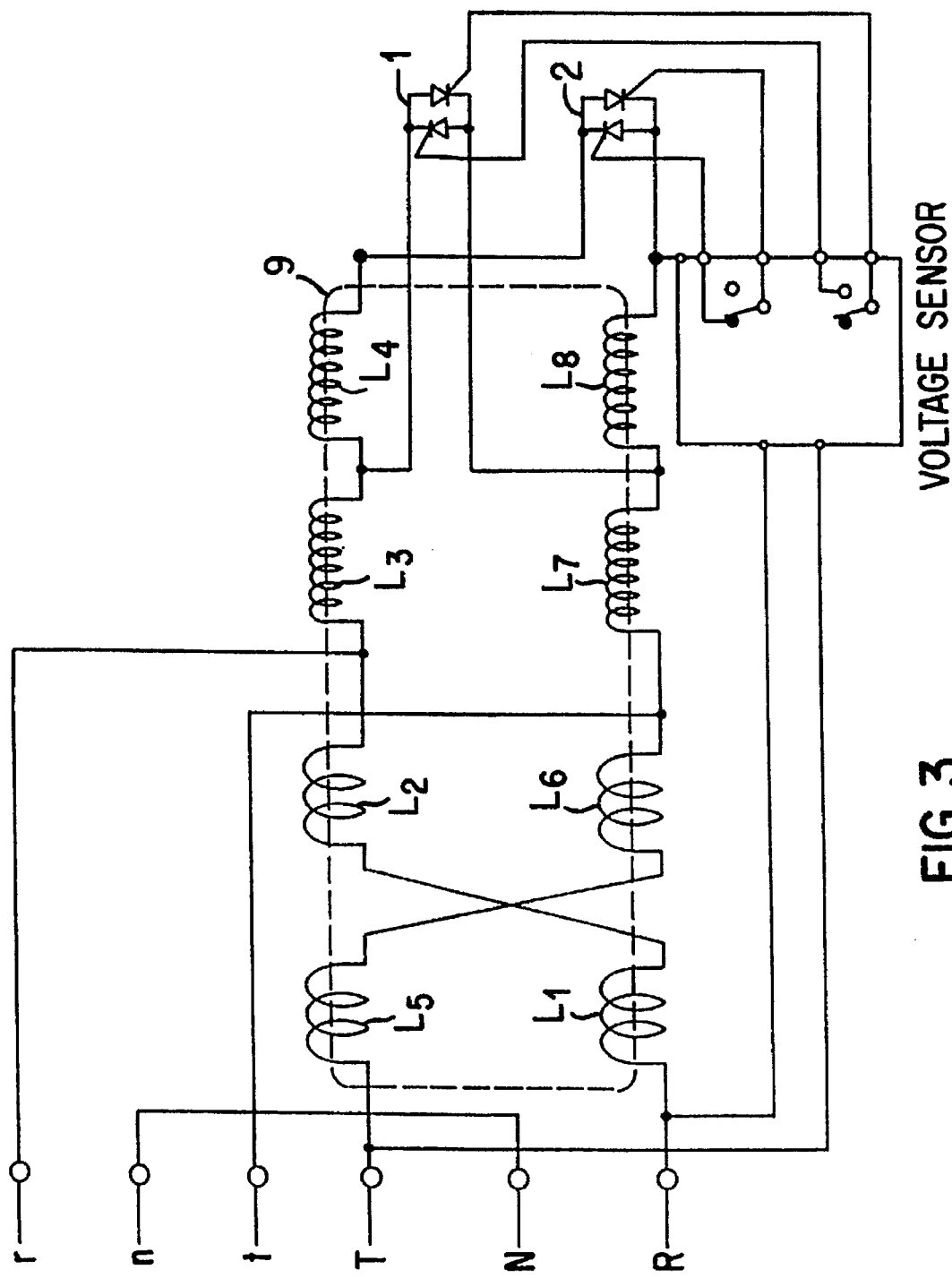
FIG. 3 is a brief block circuit diagram of a conventional economy electricity apparatus.

As shown in the line chart of FIG. 2, first, in the case of dropping of the input voltage, the circuit is connected to cause the output voltage to drop by 6 V from the initial input voltage. More specifically, in the circuit diagram of FIG. 1, by the output signal detected by the voltage sensor designed in the base plate, the thyristors (3, 4, 5) are switched to an ON state, and the other thyristors (1, 2, 6, 7, 8) are switched to an OFF state. Here, for example, when input terminals R and T are each loaded with 105 V, the main coils L1, L2, L5 and L6 are respectively dropped by 3 V by the exciting coils L3 and L7, resulting in a total voltage drop of 12 V. Therefore, the voltage of (105*2−12)/2=99 (V) is output from each output terminal of the output terminals r and t, meaning that the output voltage drops (105−99)=6 (V). As shown in the line chart of FIG. 2, the lower-voltage circuit is used just before the input voltage reaches 101 V, in which case the voltage drops below 95 V when the input voltage is dropped by 6 V. When the input voltage reaches 101 V, the lower-voltage circuit is changed to a lower-voltage circuit dropping the input voltage by 3 V to automatically decrease the voltage rate in order to prevent from dropping the voltage unnecessarily. The lower-voltage circuit is a state in which the thyristors (3, 4, 6) are ON and the thyristors (1, 2, 5, 7, 8) are OFF. At this time, all the exciting coils L3, L4, L7 and L8 are used and the voltage of the main coils L1, L2, L5 and L6 are respectively dropped by 1.5 V using the exciting coils L3, L4, L7 and L8, the total voltage being decreased by 6 V. More specifically, for example, when input terminals R and T are respectively loaded by a voltage of 100 V, the output voltage of each output terminal r and t is (100*2−6)/2=97 (V), and namely, the voltage is output to drop by (100−97)=3 (V). The line chart of FIG. 2 shows that the lower-voltage circuit is used just before the input voltage falls from 101 V to 98 V, in which case the output voltage does not drop below 95 V.

When the output voltage reaches 98 V, in order to prevent unnecessary drop of voltage, the circuit is automatically changed to a balanced-voltage circuit, in which the thyristors (3, 4, 7, 8) switched to ON and the other thyristors (1, 2, 5, 6) switched to OFF. In the balanced voltage circuit, electric current flows to mutually drown out magnetic flux from the main coils L1, L2 through the exciting coils L3, L4, and from the main coils L5, L6 through the exciting coils L7, L8, so that the voltage is unchanged, and therefore, the value of the input voltage can be output as the value of the output voltage as it is. As shown in the line chart of FIG. 2, the balanced-voltage circuit is used just before the input voltage falls from 98 V to 95 V, in which case the output voltage does not drop below 95 V as is the case with the aforementioned lower-voltage circuit. Since the input voltage has the same value as the output voltage, the line of the output voltage is illustrated to overlap with the line of the input voltage.

Further, when the input voltage drops to 95 V, the thyristors (1, 2, 6) are switched to ON and the other thyristors (3, 4, 5, 7, 8) are switched to OFF automatically, whereby the balanced-voltage circuit is changed to an upper-voltage circuit on which the build-up voltage is 3 V, corresponding to the input voltage. On the upper-voltage circuit, by the exciting coils L3, L4, L7 and L8, the main coils L1, L2, L5 and L6 are inductively generated at 1.5 V each, a total voltage of 6 V, that is, the voltage is output by increasing it more than the input voltage. For example, when the input terminals R and T are respectively loaded at a voltage of 95 V, the voltage, which is (95*2+6)/2=98 (V), is to be the output voltage respectively output from the output terminals r and t, in which the voltage is output by increasing the build-up voltage of (98−95)=3 (V). As shown in the line chart of FIG. 2, the upper-voltage circuit is used just before the input voltage falls from 95 V to 92 V, and therefore, for example, the input voltages of 95 V and 93 V are respectively output as the output voltages of 98 V and 96 V, with the result that the voltage is never lower than 95 V , which is the minimum voltage value for load.

When the input voltage is changed to 92 V, the thyristors (1, 2, 5) are switched to ON and the other thyristors (3, 4, 6, 7, 8) are switched to OFF automatically, whereby the upper-voltage circuit is changed to an upper-voltage circuit in which the build-up voltage is 6 V corresponding to the input voltage. On the upper-voltage circuit, by the exciting coils L3 and L7, the main coils L1, L2, L5 and L6 are inductively generated by 3 V each, a total of 12 V, that is, the voltage is output by increasing it more than the input voltage as in the case of the aforementioned upper-voltage circuit by 3 V. For example, when the input terminals R and T are respectively loaded at a voltage of 90 V, the voltage, which is (90*2+12)/2=96 (V), is to be the output voltage respectively output from the output terminals r and t, in which the voltage is output by generating (96−90)=6 (V). As shown in the line chart of FIG. 2, supposing that the input voltage is increased from a boundary value 90 V, the upper-voltage circuit is used just before the input voltage falls from 92 V to 90 V, and before the input voltage increases from 90 V to 93 V. Owing to the upper-voltage circuit, even when the input voltage is 90 V, the voltage can be output at 96 V as the output voltage, so that the minimum voltage value for load becomes no lower than 95 V, with the result that there happens no ill influence on load.

In changing the exciting coils, hysteresis is provided by the input voltage values in which the upper-voltage rate and the lower-voltage rate are changed when the input voltage is being increased and decreased so that the upper-voltage circuit generating by 6 V is used just before the input voltage reaches 93 V when the input voltage is increased, and thus, errors made by the apparatus are eliminated and the load on each coil is reduced. That is, when the input voltage is decreased, the upper-voltage circuit generating by 3 V at the value of the input voltage 92 V is changed to the upper-voltage circuit generating by 6 V, however, if the circuit is defined alike in the case of input voltage decreasing in which the upper-voltage circuit generating by 3 V is changed to the upper-voltage circuit generating by 6 V when the input voltage is increased, an error is made by the apparatus itself and the coils are overloaded as a result.

When the input voltage is further increased to 93 V, the aforementioned upper-voltage circuit is changed to the upper-voltage circuit generating by 3 V to switch the thyristors (1, 2, 6) to ON and the other thyristors (3, 4, 5, 7, 8) to OFF automatically. By changing from the upper-voltage circuit generating by 6 V to the upper-voltage circuit generating by 3 V, the input voltage can be prevented from unnecessarily increasing, with the result that the value of the output voltage remains within the range of the predetermined voltage so as to prevent from affecting the load. As shown in the line chart of FIG. 2, the aforementioned upper voltage circuit is used just before the input voltage rises from 93 V to 96 V.

As shown in the line chart of FIG. 2, when the input voltage is increased, the minimum voltage value of the output voltage is 96 V after changing to the upper voltage circuit generating by 3 V because, as described above, hysteresis should be provided by differencing the input voltage value in the change of the upper-voltage rate and the lower-voltage rate when the input voltage is increased and decreased, but because the minimum output voltage value for load is not lower than 95 V, there is no disadvantage of using the electric power saving transformer according to the present invention.

When the input voltage is increased to 96 V, the aforementioned upper-voltage circuit is changed to the balanced-voltage circuit to switch the thyristors (3, 4, 7, 8) to ON and the other thyristors (1, 2, 5, 6) to OFF automatically. Here, the input voltage value and the output voltage value remain the same, therefore, the line of the input voltage and the line of the output voltage overlap as shown in the line chart of FIG. 2. The balanced-voltage circuit is used just before the input voltage rises to 99 V.

And further, when the input voltage is increased to 99 V, the aforementioned balanced voltage circuit is changed to the lower voltage circuit which drops by 3 V for the input voltage to switch the thyristors (3, 4, 6) to ON and the other thyristors (1, 2, 6, 7, 8) to OFF automatically, in which the lower voltage circuit is used just before the input voltage reaches 102 V. After reaching 102 V, the thyristors (3, 4, 5) are switched to ON and the other thyristors (1, 2, 6, 7, 8) are switched to OFF so as to change to the lower voltage circuit which drops by 6 V, and when the input voltage starts to drop again, the sequence returns to the first point of the embodiment in order to follow a similar circuit as thus shown in FIG. 2.

The electric power saving transformer with the automatically transferring upper-balanced-lower voltage device according to the present invention can automatically change the circuits to be higher than the minimum voltage value of the suitably defined voltage for load by controlling the thyristors positioned between the ends of main coils and exciting coils owing to the value of the input voltage detected by the voltage sensor, in which the aforementioned switching is followed to allow the output voltage value to remain within the predetermined voltage range whenever the input voltage is decreased or increased.

The predetermined upper-voltage rate or lower-voltage rate in the embodiment are defined as 3% (3 V) and 6% (6 V) for an input voltage of 100 V, however, it can be optionally modified, and further, although the minimum voltage value for load has been explained as 95 V, the minimum voltage value for load can be modified by a switch (not shown) provided in the device; for example, it can be defined as 96 V or 97 V in accordance with the place where the electric power saving transformer according to the present invention is settled.

While the present invention has been particularly shown and described with reference to the preferred embodiments, it will be understood by those skilled in the art that the foregoing and other changes in form and detail can be made without departing from the spirit and scope of the present invention.

What is claimed is:

1. A method of an electric power saving transformation in an autotransformer of a single-phase three-wire system or a single-phase two-wire system, comprising the steps of:

phase-winding plural sets of main coils which are connected to input terminals on a single-phase core-type core in the autotransformer:

connecting plural sets of exciting coils, mutually connected in series, to wind the single-phase core-type core between the ends of the main coils and said exciting coils which are switched to ON/OFF based on the value detected by a voltage sensor connected to the input terminals of the autotransformer and to a plurality of thyristors; and disconnecting and connecting between the ends of said main coils and said exciting coils by switching ON/OFF of a set of said thyristors at one time in order to automatically change output voltage onto circuits for upper-voltage, balanced-voltage and lower-voltage in an uninterrupted manner.

2. The method of the electric power saving transformation according to claim 1, further comprising the step of having hysteresis by differencing input voltage values in which an upper-voltage rate and a lower-voltage rate are changed when the input voltage is being increased and decreased.

3. An electric power saving transformer in an autotransformer of a single-phase three-wire system or a single-phase two-wire system, comprising:

plural sets of main coils which are connected to input terminals to phase-wind on a single-phase core-type core in the autotransformer;

plural sets of exciting coils, mutually connected in series, to wind the single-phase core-type core and connected between the ends of said main coils by means of plural combinations of connections; and plural thyristors between the ends of said main coils and said exciting coils, a set of which are switched to ON/OFF at one time based on the value detected by a voltage sensor connected to the input terminals of the autotransformer, so that by switching ON/OFF of each set of said thyristors, at least one of said coils are connected or disconnected between said ends of main coils and said exciting coils to automatically change output voltage onto circuits for upper-voltage, balanced-voltage and lower-voltage in an uninterrupted manner.

4. The electric power saving transformation apparatus according to claim 3, further comprising hysteresis provided by differencing input voltage values in which an upper-voltage rate and a lower-voltage rate are changed when the input voltage is being increased and decreased.

5. The method of electric power saving transformation according to claim 1 wherein the upper voltage rate and the lower voltage rate ranges between about three percent to about six percent.

6. The method of electrical power saving transformation according to claim 1 wherein the upper voltage rate and the lower voltage rate is in predetermined steps.

7. The electric power saving transformation apparatus according to claim 3 wherein the upper voltage rate and the lower voltage rate is in predetermined steps.

8. The electric power saving transformation apparatus according to claim 3 wherein the upper voltage rate and the lower voltage rate ranges between about three percent to about six percent.

* * * * *